April 30, 1968 A. PASINI 3,381,272

DATA TRANSMISSION SYSTEM

Filed Oct. 5, 1964 5 Sheets-Sheet 1

INVENTOR.
ARNALDO PASINI
BY
Shoemaker and Mattare
ATTYS.

DATA TRANSMISSION SYSTEM

Filed Oct. 5, 1964 5 Sheets-Sheet 2

INVENTOR.
ARNALDO PASINI
BY
Shoemaker and Mattare
ATTYS.

April 30, 1968 A. PASINI 3,381,272

DATA TRANSMISSION SYSTEM

Filed Oct. 5, 1964 5 Sheets-Sheet 3

INVENTOR.
ARNALDO PASINI
BY
Shoemaker and Mattare
ATTYS.

INVENTOR.
ARNALDO PASINI
BY
Shoemaker and Mattare
ATTYS.

INVENTOR.
ARNALDO PASINI
BY
Shoemaker and Mattare
ATTYS.

United States Patent Office 3,381,272
Patented Apr. 30, 1968

3,381,272

DATA TRANSMISSION SYSTEM

Arnaldo Pasini, Milan, Italy, assignor to Ing. C. Olivetti & C., S.p.A., Ivrea, Italy, a corporation of Italy Filed Oct. 5, 1964, Ser. No. 401,509
Claims priority, application Italy, Oct. 14, 1963, 21,237/63
4 Claims. (Cl. 340—146.1)

ABSTRACT OF THE DISCLOSURE

In a system for continuously transmitting data in form of blocks from a transmitting station to a receiving station, the transmitting station associates to each transmitted block and stores a labeling number, and the receiving station is able after the correct reception of a block to cause a block counter to advance one step and to transmit a feedback signal representing the number contained in said counter after said step, said transmitting station comprising means for comparing the stored labeling number of the block currently being transmitted and said feedback signal for keeping said two stations in synchronism.

The present invention relates to a data transmission system, wherein data in form of blocks of characters are transmitted from a transmitting station to a receiving station.

In order to check the correctness of the transmission, it is known to transmit after each block a group of redundancy bits having a predetermined relation with the bits of the transmitted block, whereby the receiving station is able to check the validity of each received block by verifying if said predetermined relation exists. Having received a block, the receiving station sends to the transmitting station over a feed-back channel either an acceptance signal or a request for repetition of said block depending on whether said block has proven valid or not.

Due to noise in the feed-back channel, loss of synchronism may occur between the two stations, in that the receiving station may receive a block different from the one it was waiting for.

To overcome this inconvenience a transmission system has been proposed, wherein the transmitting station associates a labeling number to each transmitted block and stores said labeling number and the receiving station comprises a block counter which is advanced one step at the end of the reception of said block provided the receiving station has verified its validity and provided the labeling number associated to said block is equal to the contents of said counter, said receiving station being able to transmit a feed-back signal representing the number contained in said counter after said step.

After transmitting a block, the transmitting station waits for the feed-back signal, and upon receiving it, begins to transmit the block whose labeling number corresponds to said feed-back signal, whatever the next previously transmitted block may be. The necessity of waiting for the feed-back signal prior to transmitting the next following block entails a substantial reduction in transmission speed.

This disadvantage is obviated by the system according to the invention, which is characterized in that the transmitting station comprises means conditioned on the comparison between said stored labeling number and said feed-back signal for keeping said two stations in synchonism, whereby the transmitting station after transmitting a block is allowed to immediately transmit the next following one without waiting for the corresponding feed-back signal. It is thus apparent that the system according to the invention speeds up the transmission with respect to the known systems.

This and other features and objects of the invention will be apparent from the following description of a preferred embodiment thereof, taken in conjunction with the accompanying drawings, wherein:

FIG. 1, comprising FIGS. 1*a*, 1*b*, 1*c* and 1*d*, is a block diagram of the transmission system according to said embodiment;

Figure 1A:
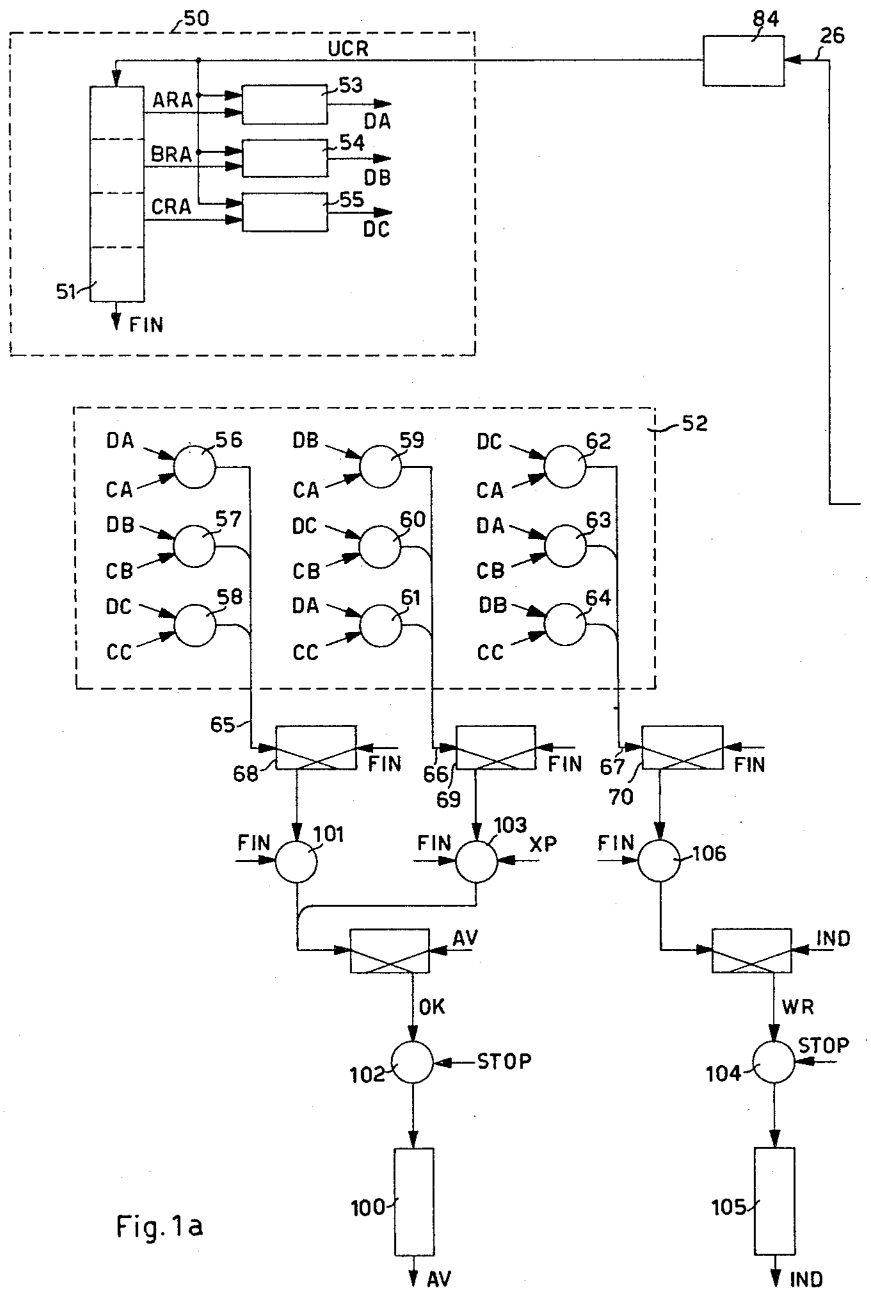
FIGS. 1*a*, 1*b*, 1*c* and 1*d* are to be composed.
Figure 1B:
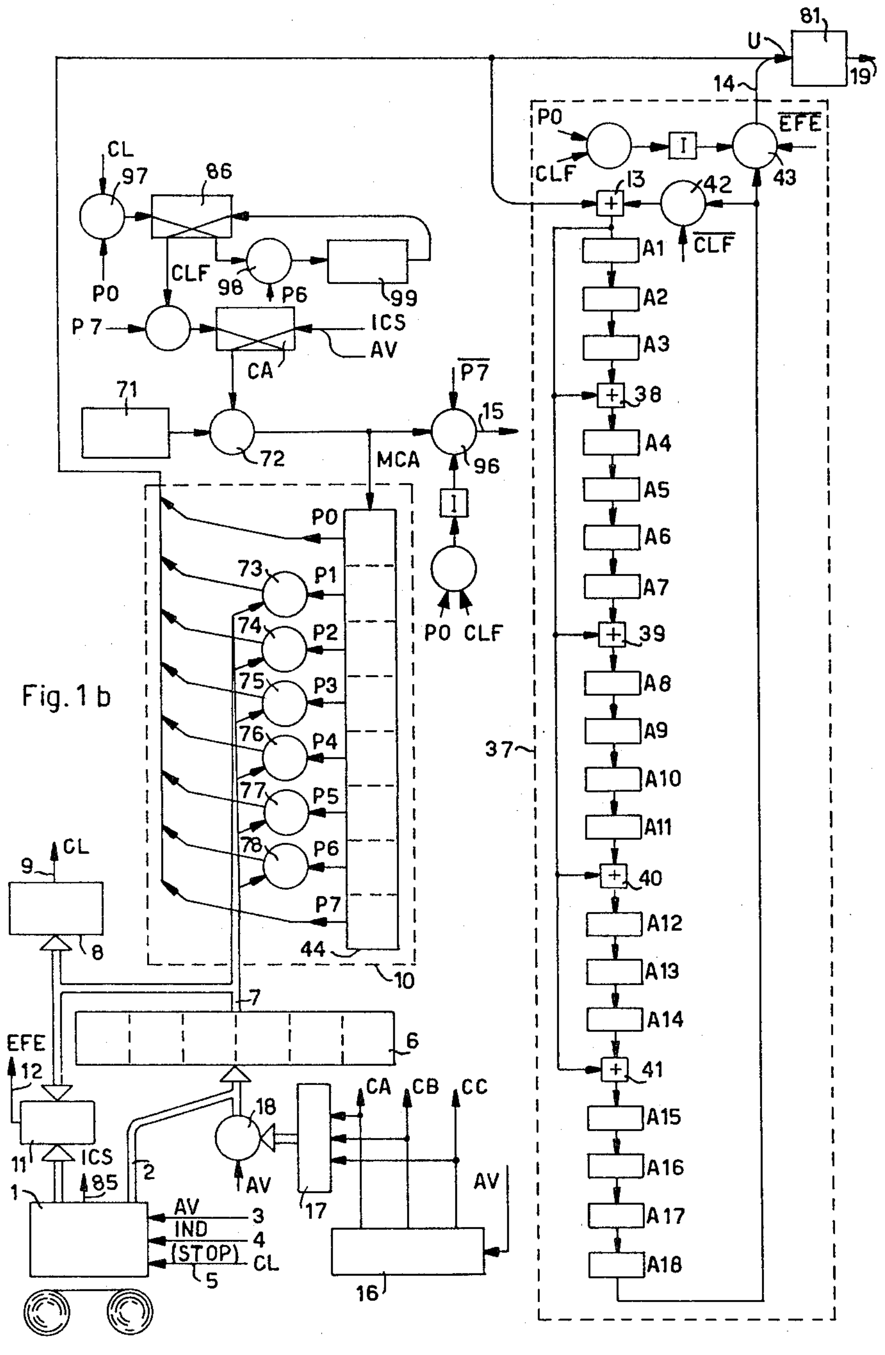
Figure 1C:
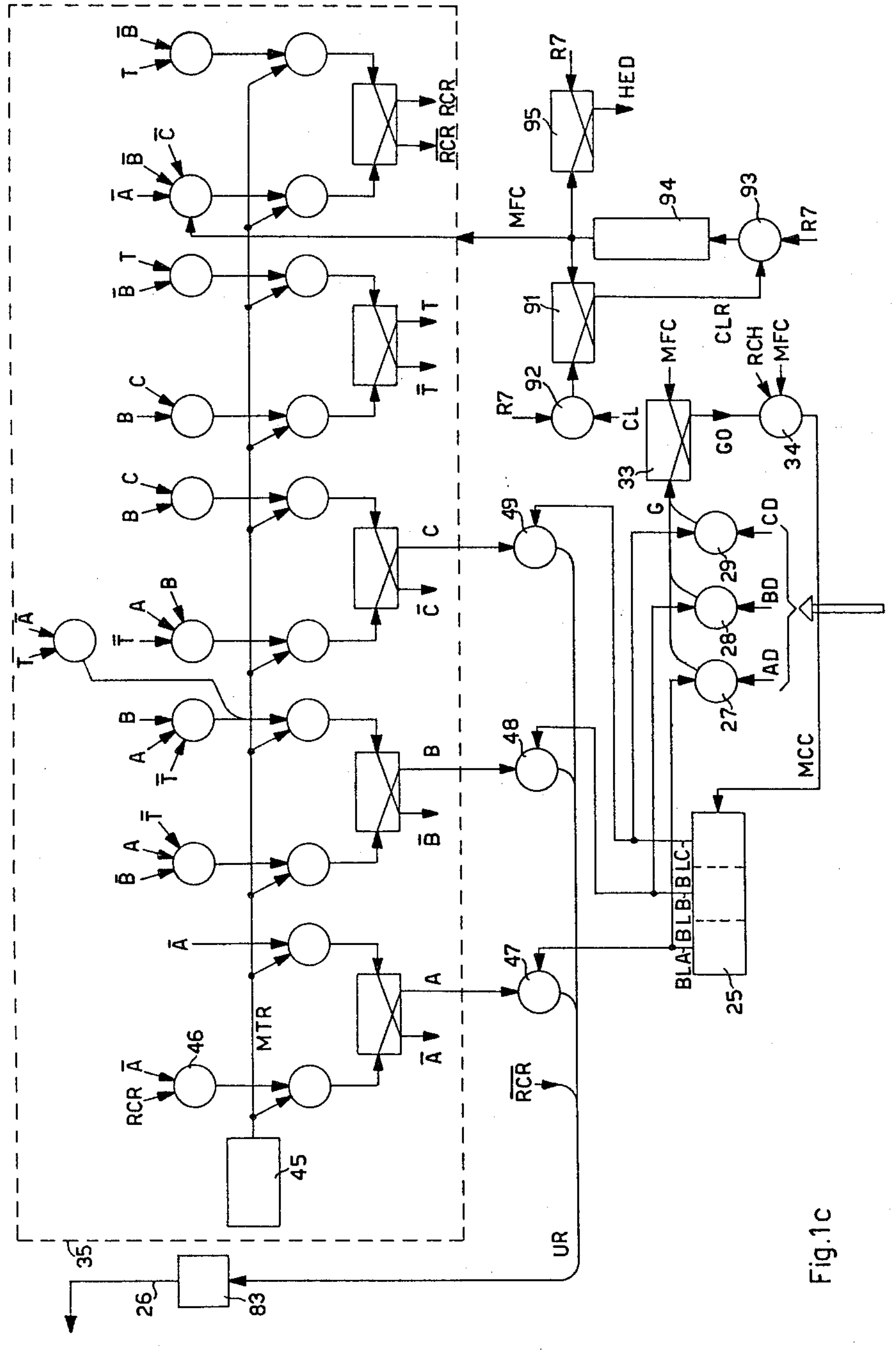
Figures 1D, 3:
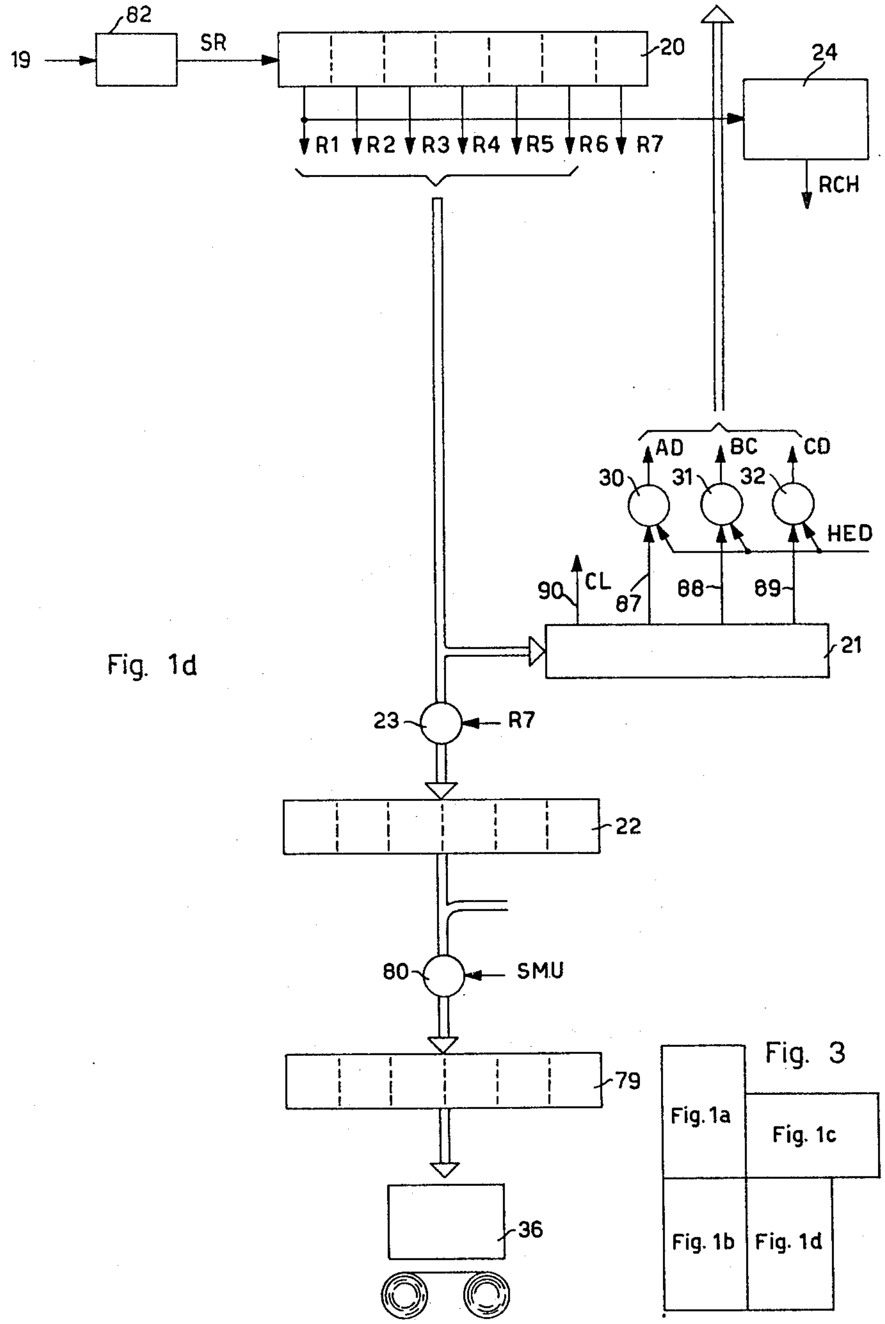
FIG. 3 shows how

According to the embodiment shown in FIG. 1, the input device for the data to be transmitted is a punched tape reader 1 and the output device for the transmitted data is a tape punch 36, each transmitted character being represented in a six-bit code.

The characters to be transmitted are grouped in blocks having a length (number of characters) variable up to a maximum, say eighty characters. At the end of each block there is a special end-of-block character CL. After reading and transmitting the end-of-block character CL, eighteen redundancy bits are transmitted. Said redundancy bits, which are grouped into three check characters, are computed by a redundancy bit generator 37 to be described later.

The transmitting station (FIGS. 1*a* and 1*b*) and the receiving station (FIGS. 1*c* and 1*d*) are connected through a forward channel 19 and through a feed-back channel 26 whose transmission speeds are 1200 baud and 50 baud respectively.

The intelligence issuing from the transmitting station over the output terminal U is fed through a modulator 81 to the forward channel 19, and after transmission is demodulated by a demodulator 82, which feeds the input terminal SR of the receiving station.

The intelligence issuing from the output terminal UR of the receiving station is fed through a modulator 83 to the feed-back channel 26 and after transmission is demodulated by a demodulator 84 which feeds the input terminal UCR of the transmitting station.

The transmitting station (FIGS. 1*a* and 1*b*) comprises a tape reader 1, which, having read a character, produces in parallel on its output 2 the six bits representing said character and with a slight delay a signal ICS on the output 85.

Moreover the reader 1 is adapted to receive on a terminal 3, 4, 5 a command AV, IND and STOP respectively, which causes the tape to begin running forward, running backward or stop respectively.

At the end of the reading of each block the reader 1 receives a signal STOP, which stops the tape, and thereafter either a signal AV or IND depending on whether the next following block is to be transmitted or the transmission of a preceding block is to be repeated.

The output 2 of the reader 1 feeds a staticizing register 6 which is adapted to store the six bits of each read character until the reading of the next following character.

The output 7 of the register 6 feeds an end-of-block character decoder 8 which is able to examine the character stored at the moment in the register 6 and produce a signal on the output 9 should said character be an end-of-block character CL. Moreover the output 7 feeds a parallel-to-serial converter 10 which is able to supply in serial form on the output U the six bits of each character read and stored in parallel form in the register 6 and moreover to supplement the group of six bits with a start bit and a stop bit inserted before and after said group respectively. The output 7 feeds also a comparator 11 which compares the character stored in the register 6 with the same character as read by a second reading station included in the reader 1 in order to provide an error signal EFE on the output 12 when discrepancy is detected.

The parallel-to-serial converter 10 comprises a counter 44, including eight stages P0 to P7, whose last stage P7 is energized when the counter 44 is in the reset condition. The counter 44 receives counting pulses MCA at a frequency of 1200 pulses per second from a generator 71 via a gate 72 controlled by a bistable circuit CA. The bistable circuit CA is set by the signal ICS produced by the reader 1 after reading each character and is reset by the signal P7 when stage P7 of the counter 44 switches to the "set" state, whereby counter 44 upon receiving each end-of-character signal ICS receives only a train of eight pulses MCA.

The first pulse MCA of said train energizes stage P0. Therefore, as all remaining stages of the counter are de-energized, a binary signal having the level "zero" and the function of a start signal is sent over the output U to the forward transmission channel 19. The following six pulses MCA, by successively energizing the gates 73 to 78 respectively, cause the six bits of the character stored in the register 6 to be sent over the line U at a 1200 baud transmission speed. The eighth pulse MCA by energizing stage P7 causes a binary signal having the level "1" and the function of a stop signal to be sent over the line U.

A block counter 16, comprising three stages provided with outputs CA, CB, CC respectively, is arranged to count modulo three all the blocks being read. Otherwise stated, the block counter 16 is arranged to associate progressive numbers to the succesive blocks issuing from the tape reader 1, according to the cyclic sequence A, B, C, A, B, C, A . . . , where A, B and C designate the three digits of a ternary number system.

Before the transmission of each block, the number contained in the block counter 16 is decoded into the six bits code used on the tape by a decoder 17 and then is fed into the register 6. To this end before the transmission of each block a signal AV opens the gate 18. As also the signal AV, by setting the bistable circuit CA, causes a train of eight pulses MCA to be sent to the counter 44, said digit A, B or C is transmitted just before the relevant block as a heading character, in order to signify to the receiving station the labeling number of said block.

A redundancy bit generator 37 comprises a shift register including eighteen stages A1 to A18. The bits present on the output U of the parallel-to-serial converter 10, besides being transmitted over the forward channel 19, are sent to a binary half adder 13, whose output feeds the first stage A1 and the half adders 38, 39, 40 and 41.

The output of the last stage A18 is fed to both the half adder 13 via a gate 42 and the forward channel via a gate 43. The operation of a redundancy bit generator of this type is fully described in the magazine Proceedings of the IRE, January 1963, with particular reference to FIG. 3 on page 233. For the purposes of the present description it is sufficient to point out that, during the transmission of each block, gate 42 is open and gate 43 is closed, because the signal CLF produced by the bistable circuit 86 is absent. Under these conditions the operation of the shift register and of the half adders associated therewith is such that at the end of the transmission of said block eighteen redundancy bits are made available in said shift register. Upon reading the end-of-block character CL, the output CLF of the bistable circuit 86 is energizing, whereby gate 42 is closed and gate 43 is opened. Under these conditions, the eighteen bits are shifted out from shift register and sent over the forward channel 19 as a sequence of three six-bit characters.

The receiving station (FIG. 1*c* and 1*d*) comprises a serial-to-parallel converter 20, which is made of a shift register including seven stages designated with the symbol of the corresponding output R1 to R7 and is fed by the forward channel 19 in such a way that the reception of each bit causes the bit itself to be written into the first stage R1 and the bits stored in the other stages to be simultaneously shifted one stage. The completion of the reception of each character is indicated by the output R7 being energized due to the shifting of the start bit of said character into the last stage of the register 20.

Register 20 feeds a special-character decoder 21, which energizes its output 87, 88, 89 or 90 which the character stored in the converter 20 is a heading character A, B, C or an end-of-block character CL respectively.

The character stored in the converter 20 is transferred into a buffer register 22 when energization of output R7 (end of the serial-to-parallel conversion of the character) causes a gate 23 to be opened. The tape punch 36 is fed by a register 79 to punch a character at a time. The characters stored in the buffer register 22 is transferred into register 79 when a gate 80 is opened by a signal SMU generated by the punch and indicating that punch is ready to operate.

The output R1 of the first stage of the converter 20 feeds a checking circuit 24, structurally equal to the redundancy bit generator 37 except that gate 42 is permanently open and gate 43 permanently closed. The output RCH of the checking circuit 24 is energized only when the eighteen bits stored in the eighteen stages thereof are all "zero." As also the structure and operation of the checking circuit are known from the aforementioned publication, it is sufficient to point out that the eighteen stages of the checking circuit, upon receiving from output R1 all the bits of the character of a transmitted block and the associated eighteen redundancy bits, are all reset to the zero state only if said redundancy bits bear a predetermined relation to the bits of the transmitted block, whereby the checking circuit 24 is adapted to check the validity of each block received.

The output CLR of a bistable circuit 91 is energized via a gate 92 by the signal R7 indicating the end of the reception of the end-of-block character CL of each block. Therefore the signals R7 produced upon receiving the following three check characters are sent, via a gate 93, to a counter 94, which upon receiving the third signal produces an end-of-check signal MCF and resets the bistable circuit 91 so as to deenergize its output CLF. It is thus apparent that the signal CLR is present during the reception of the three check characters of each block and that a signal MCF is produced at the end of the checking of each block.

The signal MFC energizes the output HED of a bistable circuit 95, which is thereafter deenergized by the signal R7 indicating the completion of the reception of the next following character. As said character is the heading character A, B or C of the next following block, it is thus apparent that the signal HED is absent when receiving all characters but the heading characters.

The receiving station is furthermore provided with a block counter 25, comprising three stages having outputs BLA, BLB and BLC respectively, and arranged to count modulo three the received blocks which have proven to be valid and to be associated with the required heading character. The progress in counting of said blocks is indicated by the outputs BLA, BLB and BLC being sequentially energized.

More particularly three coincidence circuits 27, 28 and 29 are fed by the outputs BLA, BLB and BLC respectively of the block counter 25 and by the outputs 87, 88 and 89 respectively of the special-character decoder 21 via gates 30, 31 and 32 respectively, which are opened by the signal HED indicating that a block heading character is being received. Said coincidence circuit are therefore adapted to compare said received heading character A, B or C with the number A, B or C stored in the block counter 25 in order to produce a signal G if equality is detected.

Said signal G energizes the output G0 of a bistable circuit 33, which in turn is deenergized by every signal MFC indicating the completion of the checking of a received block. Therefore said output G0 remains energized from the end of the reception of the heading character of a block until the completion of the checking of said block, provided said received heading character is equal to the contents of the counter 25, that is, provided the labeling number A, B or C of the received block is equal to the one requested by the receiving station. The signal MFC, indicating that checking of a block is ended, is sent as a counting signal to the block counter 25 via a gate 34 which is open only when the outputs G0 and RCH are energized, whereby counter 25 effectively advances one step only at the end of the received blocks which are headed by the character A, B or C requested by the receiving station and have proven to be valid in the checking circuit 24.

A feed-back signal generator 35 located in the receiving station comprises (FIG. 1*c*) a binary counter including $K=4$ binary stages which will be hereinafter designated with the symbol of their direct output A, B, C, T. A pulse generator 45 produces at a 50 Hz. frequency an uninterrupted train of counting pulses MTR, which are routed to the several stages of the counter under the control of a logic network not herein described in detail because fully represented in FIG. 1*c*. Said logic network is such that, beginning from a start condition wherein all stages are energized, that is have their direct output A, B, C, T energized, each one of the four stages A, B, C, T is driven through a different series of binary states, say 01010101010, 00110011100, 00001110000, 00000001110 respectively.

The outputs A, B, C of the feed-back signal generators 35 may be selectively connected to the feed-back channel 26 via gates 47, 48 and 49 respectively, which are opened under the control of the block counter 25. More particularly the feed-back channel is connected to the output A, B or C when the number contained in the counter 25 is A, B or C respectively. A bistable circuit RCR, which is set by the signal MCF indicating that reception and checking of a block is finished, is reset by the eleventh counting pulse MTR fed to the counter of the feedback signal generator 35, and having been thus reset keeps gate 46 closed, whereby said counter stops. Therefore the bistable circuits RCR allows said counter to receive only one train of eleven counting pulses MTR, whereby the feed-back signal generator 36 normally produces and transmits only once at the end of the reception of each block a train of eleven bits. It is to be noted that the first of said eleven pulses MTR causes all the stages A, B and C to be deenergized and that the eleventh pulse MTR sets the bistable circuit RCR. Therefore, the feed-back channel being fed also by the output RCR, a first binary signal having the level "zero" and the function of a start signal, nine bits constituting the feed-back signal proper and a last binary signal having the level "one" and the function of a stop signal are transmitted over said feed-back channel at the end of the reception of each block over the forward channel.

A feed-back signal decoder 50, located in the transmitting station, comprises (FIG. 1*a*) a counter 51 analogous to counter 35 and arranged to produce on three outputs ARA, BRA, CRA trains of nine pulses (101010101, 011001110 and 000111000 respectively) which are equal to the pulse trains produced on the outputs A, B and C respectively of the feed-back signal generator 35. Said pulse trains are emitted concurrently with the reception of the nine bits of the feed-back signal. To this end the counter 51 is provided with a bistable circuit, not shown in the drawings, equal in structure and function to the bistable circuit RCR of the feed-back signal generator 35, except that it is controlled by the start bit of the feed-back signal instead of the signal MFC indicating the end of the reception of a block.

Furthermore the counter 51 produces a signal FIN at the end of each pulse train, that is at the end of the reception of each feed-back signal.

Each output ARA, BRA and CRA feeds a binary comparator 53, 54 and 55 respectively, which is arranged to compare the incoming feed-back signal with the pulse train produced on said output respectively. More particularly the output DA, DB and DC of the comparator 53, 54 or 55 remains deenergized during all the time spent in receiving the nine bits of the feed-back signal only in the event said nine bits are found to be equal respectively to the nine bits concurrently produced on said output ARA, ARB and ARC respectively, whereas upon detecting discrepancy between any pair of bits concurrently fed to one of said comparators, the corresponding output DA, DB or DC is energized. Therefore in the time interval during which the feed-back signal is received, output DA or DB or DC or no output will remain continuously deenergized depending on whether said received nine bits represent the labeling number A or B or C or a number which cannot be recognized, that is different from A, B or C. A logic network 52 for comparing the feed-back signal with the number stored in the block counter 16 of the transmitting station comprises nine "and" gates 56 to 64 and is fed by the outputs of the comparators DA, DB, DC and by the outputs CA, CB, CC of the block counter 16 as shown in FIG. 1*a*, whereby the outputs 65, 66, 67 remain continuously deenergized throughout the time interval during which the feed-back signal is received, if the number represented by said feed-back signal is equal, one unit less or one unit greater than the contents of block counter 16, respectively.

Therefore a bistable circuit 68, 69, 70, which has been reset by signal FIN at the end of the reception of each feed-back signal, is set during reception of the next following feed-back signal if and only if the number represented by the last named feed-back signal is equal to the contents of block counter 16, one unit less or unit greater respectively.

As hereafter explained, the bistable circuits 68, 69 and 70 control bistable circuits OK and WR governing the motion of the tape in the reader 1.

The operation of the system will now be briefly described with reference to the time diagram of FIG. 2.

Figure 2:
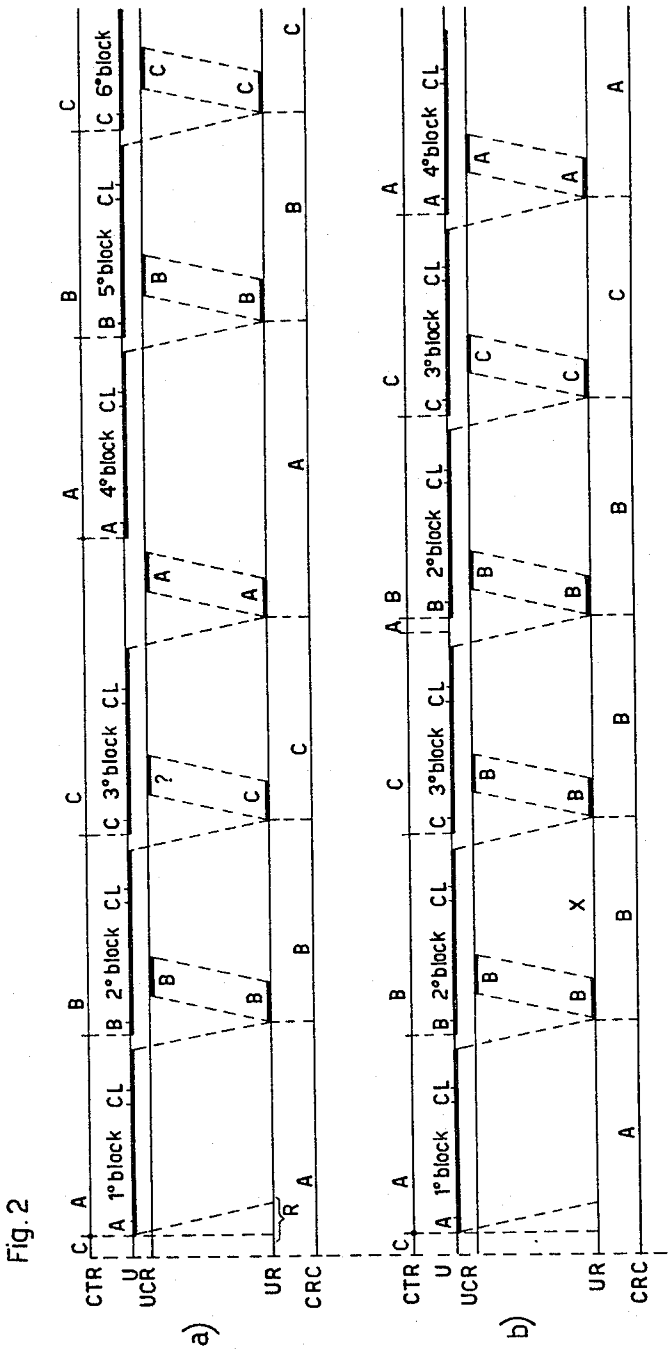
FIG. 2 is a time diagram showing the progress of the transmission and reception.

In FIG. 2 line CTR indicates the state of block counter 16 in the transmitting station, line U indicates the intelligence transmitted from said station, line UR indicates the intelligence transmitted from the receiving station, line UCR the intelligence received at the transmitted station and line CRC the state of the block counter 25 of the receiving station.

At the beginning the operator by pushing a start pushbotton sets block counter 16 of the transmitting station into state C, starts tape reader 1 by manually producing a signal AV and sets moreover some registers and bistable circuits into predetermined initial states as hereinafter specified. It is assumed that at the same tiem the receiving station is prepared for reception, by setting block counter 25 of the receiving station into state A, and starting the tape punch 36, so that the punch produces a signal SMU in every punching cycle, irrespective of whether a character is really punched or not.

When the tape in reader 1 begins its forward run, the signal AV advances block counter 16 one step, that is into state A.

The same signal AV by opening the gate 18 causes the number A stored in block counter 16 to be written into register 6 after having been decoded by decoder 17 into a six bits character.

Moreover the signal AV by energizing the output of the bistable circuit CA causes a train of eight counting pulses MCA to be sent from generator 71 to counter 44.

Therefore the number A stored in the register 6 is serialized as previously explained and transmitted over output terminal U, to the receiving station. Said number is sent also to the redundancy bit generator 37. More particularly, the output CLF of bistable circuit 86 being normally deenergized, the seven first occurring counting pulses MCA of said pulse train produced by generator 71 are sent as shift pulses over terminal 15 to the shift register A1–A18 of the circuit 37. It is thus apparent that the start bit and the six bits of said labeling number A are fed to redundancy bit generator 37, whereas the stop bit is not fed thereto bacause gate 96 is closed during signal P7 (eighth bit time of the transmitted character).

Thereafter, as tape reader 1 has been started, the first character of the first block to be transmitted is read and staticized in register 6. After reading said character, the character signal ICS produced by reader 1 reenergizes the output of the bistable circuit CA, thus causing a second train of eight counting pulses MCA to be fed to serializing counter 44, whereby said first character is serialized and transmitted both to the receiving station over output line U and to the redundancy bit generator 37.

In the same manner the following characters of the first block are sucessively read and transmitted over the forward channel 19.

Finally the end-of-block character CL is read, transmitted over forward channel 19 and sent to the redundancy bit generator 37 like the preceding characters.

Moreover the reading of character CL causes the output 9 of the decoder 8 to be energized so as to produce a signal CL. Therefore a command STOP is produced on line 5 to cause the tape to be stopped, and gate 97 is opened, whereby the energization of the stage P0 of counter 44 causes the bistable circuit 86 to be set via said gate 97 thus energizing output CLF. Hence in the redundancy bit generator 37 gate 42 is closed and gate 43 is opened, so that the output of the last stage A18 of the redundancy bit generator 37 is connected to the forward channel 19. The following signal P7 cannot reset the bistable circuit CA, whereby gate 72 remains open thus allowing further trains of eight pulses MCA to be fed from generator 71. More particularly said trains are three, because each signal P6 produced by one of said trains is fed via a gate 98 to a counter 99 which upon receiving the third signal P6 resets the bistable circuit 86 so as to deenergize the output CLF. Therefore on the output 15 three pulse trains each made of six shift pulses are produced, in each train said six shift pulses occurring during signals P1 to P6 respectively. The eighteen redundancy bits stored in the redundancy bit generator 37 are thus shifted out over the forward channel 19 as a sequence of three characters each having the normal six-bit length.

Through gate 99, which is open because the manual start command had set the bistable circuit OK, the same command STOP produced by reading the end-of-block character CL generates a command AV after a certain time interval determined by a delay circuit 100. The command AV starts the tape again, whereby the second block of character is transmitted in the manner hereinbefore explained for the first block. It is to be noted that the command AV advances one step the block counter 16 which is thus driven into the state B, whereby the labeling number B is transmitted before said second block as an heading character.

The receiving station receives the first character, that is the heading character A of the first block, after a delay R (FIG. 2*a*) depending on the transmission characteristics of the forward channel. When the sixth bit of said character enters the first stage R1 of the register 20, the start bit of said character enters the last stage R7 of said register, whereby a signal R7 is generated to indicate that reception of a character is completed. Said signal R7 by opening gate 23 causes said first character to be transferred into the buffer register 22.

A circuit not shown in the drawings controls the gate 80 to prevent all heading characters and all check characters from being punched on the tape. It is thus apparent that the intelligence read on the tape at the transmitting station is restored to its previous form on the tape produced at the receiving station, without unduly punching the intelligence transmitted over the forward channel for the purpose of controlling and checking the transmission.

Upon receiving the heading character A the output 87 of the special character decoder 21 is energized. Therefore, the output AD is energized via gate 30, because said gate is opened by signal HED produced by the bistable circuit 95, which has been set by the manual start signals at the beginning of the operation.

As shown in FIG. 2*a*, the heading character A representing the labeling number of the first block being now received is equal to the contents of the block counter 25 of the receiving station, which is the expected labeling number. Therefore the output of the coincidence circuit 27 is energized, thus energizing the output G0 of the bistable circuit 33, which will remain energized until the end of the reception of the block to indicate that the heading character (labeling number) of the block was exactly the one the receiving station expected. The signal R7 indicating that the reception of the character is completed is used to thereafter reset the bistable circuit 95 so as to extinguish signal HED.

In the same manner the second received character, which is the first character of the block, is staticized and stored in the buffer register 22. Thereafter said second receved character is transferred into the register 79 and hence punched when the signal SMU generated by punch 36 opens the gate 80. In the same manner the following characters are received and punched. Finally the end-of-block character CL is received. This, besides being transferred as the previous characters into the buffer register 22, causes the output 90 of the special character decoder 21 to be energized. A circuit not shown in the drawings and operated by said output G0 controls the gate 80 to prevent said end-of-block character CL from being transferred from buffer register 22 to punch register 79 and thereby delay punching until the checking of the corresponding block is completed. The signal CL produced on output 90 opens gate 92 whereby the signal R7 produced at the end of the reception of said character CL sets via gate 92 the bistable circuit 91 to produce the signal CLR designating the time interval during which the three check characters are received and, via gate 93 and counter 94, the signal MFC indicating that checking is completed, in the manner previously explained.

The end-of-check signal MFC sets the bistable circuit 95 to energize output HED, whereby the next following received character will be regarded by the receiving station as the heading character of the next following block.

In the meantime, during reception of the first block the received bits had been sent also to the checking circuit 24. Assuming that the received block has proven valid, the output RCH of the checking circuit 24 after receiving the first block and the eighteen redundancy bits (three check characters) associated therewith will be energized.

The end-of-check signal MFC is fed as a counting signal MCC via gate 34 to the block counter 25, which is therefore driven into the state B to signify that the next following block that the receiving station expects to receive is one having as heading character the labeling number B.

The same end-of-check signal MFC causes the end-of-block character CL to be transferred into register 79 and therefore to be punched on the tape. Moreover the end-of-check signal MFC sets the bistable circuit RCR of the feed-back signal generator 35. This generator is therefore activated, as before explained, so as to produce once only a different series of nine bits simultaneously on each output A, B and C respectively.

As the present state of block counter 25 is such as to keep the gate 48 open and gates 47 and 49 closed, output B of the feedback signal generator 35 is connected to the feed-back channel 26 while outputs A and C are disconnected therefrom. Thus the generator 35 transmit over the feed-back channel 26 a feed-back signal consisting of the sequence of bits 011001110, which in the code of the feed-back channel represent just the labeling number B. By this way the receiving station signifies to the transmitting station the labeling number of the block it is waiting for.

As shown in FIG. 2*a*, the transmitting station goes on to transmit the second block without waiting for the feed-back signal corresponding to the first transmitted block.

When the start bit of the feed-back signal reaches the input terminal UCR of the transmitting station, the counter 51 of the feed-back signal decoder 50 is started. Assuming the bit sequence of the feed-back signal has not been altered by noise in the feed-back channel or other disturbance, it will coincide with the bit sequence concurrently produced on the output BRA of counter 51, whereby the output DB will remain continuously deenergized during reception of said sequence, whereas outputs DA and DC will be energized at least once.

In the logic network 52 only the "and" gates 57, 60 and 63 may have their output energized, because block counter 16 being in the state B (FIG. 2*a*) produces a signal CB. Thus at the end of the reception of the feed-back signal the bistable circuits 69 and 70 will have their outputs deenergized, while the output of the bistable circuit 68 will be energized.

Therefore the signal FIN produced by counter 51 and indicating that reception of the feed-back signal is completed causes the bistable circuit OK to be set via gate 101. The resulting energization of the output of said bistable circuit OK indicates that, on the basis of the comparison between the feed-back signal just received and the state of the block counter 16, the transmission takes place correctly. Therefore, upon receiving the next following command STOP, which is produced upon reading the end-of-block character CL for the second block being now transmitted, a command AV is produced through gate 102 and delay circuit 100 to immediately restart tape reader 1 for reading and transmitting the third block. The same command AV resets the bistable circuit OK.

At the receiving station, at the end of the reception of the second block, the end-of-check signal MFC advances the block counter 25 one step, that is into state C, assuming said second block has proven to be valid in the checking circuit 24. Therefore a feed-back signal representing the labeling number C is transmitted.

It is assumed that, due to disturbance in the feed-back channel, said feed-back signal as received at the transmitting station is not recognizable, as symbolically indicated with the sign "?" in FIG. 2*a*. In this case, during reception of said feed-back signal at the transmitting station each one of the outputs DA, DB, DC of the comparators 53, 54 and 55 respectively will be energized at least once, due to inequality of some pair of simultaneously received bits. Therefore none of the bistable circuits 68, 69 and 70 will have its output energized at the end of the reception of said feed-back signal, whereby the signal FIN at said end will energize neither the output of the bistable circuit OK nor the output of the bistable circuit WR.

In the meantime the transmission of the third block is continued and when upon reading the end-of-block character CL the command signal STOP is produced, neither a command AV nor a command IND is produced, due to absence of the signal OK and WR at the inputs of gates 102 and 104, whereby tape reader is kept at rest waiting for further commands.

In the receiving station, after reception of the third block, which is supposed to have proven valid in the checking circuit 24, the block counter 25 advances one step to the state A, whereby the feed-back signal A is transmitted over the feed-back channel. It is first assumed that said feed-back signal is correctly transmitted. Therefore, in the transmitting station, as the block counter 16 is yet in the state C, the outputs of the bistable circuits 68 and 70 are deenergized via gates 58 and 64, while the output of the bistable circuit 69 remains energized thus indicating that the count of the block counter 16 of the transmitting station is one block less than the count of the block counter 25 of the receiving station, that is the receiving station is not synchronized and more exactly advanced one block with respect to the transmitting station. The output of the bistable circuit 69 remains energized until the signal FIN indicating the end of the reception of the feed-back signal. Therefore said signal FIN causes the output of the bistable circuit OK to be energized via gate 103 which is opened by a signal XP indicating that tape reader 1 is at rest. Thus a command signal AV is produced through gate 102 and delay circuit 100 to restart reader 1. Thereafter the transmission resumes its regular course.

Assuming on the contrary that also the feed-back signal A emitted by the receiving station upon receiving the third block is received as a not recognizable number by the transmitting station, then the tape reader 1 is kept yet at rest. After a predetermined time interval and under the control of a circuit not shown in the drawings, the receiving station then repeats one time or more the transmission of the feed-back signal A, unit said feed-back signal, due to disappearance of the disturbances on channel 26, is received as a recognizable signal.

It is now assumed (FIG. 2*b*) that due to noise in the forward channel the second block as received has been proven invalid in the checking circuit 24, as symbolically indicated with the symbol X in FIG. 2*b*. At the receiving station at the end of the checking of said second block the output RCH of the checking circuit 24 is deenergized, thus indicating that the received block is not valid. Therefore gate 34 is closed, whereby the end-of-check signal MFC cannot be fed to the block counter 25 as a counting pulse MCC. Thus block counter 25 remains in the state B, whereby a feed-back signal representing the labeling number B is transmitted on channel 26. It is therefore apparent that also in this case the feed-back signals represent the labeling number of the last received block having the required validity and headed by the labeling number expected by the receiving station.

As before stated, at the end of the checking of each received block the block counter 25 does not advance if said block has proven either invalid or associated with a heading character different from the expected one or both. The tape punch 36 is controlled by a circuit not shown in the drawings to punch at the end of each block whose reception does not step the block counter 25, a special "error" character followed by the end-of-block character CL. As before mentioned, punching of the character CL had been held in abeyance while waiting for the response of the checking circuit 24.

When the transmitting station receives said feed-back signal B for the second block, it is yet transmitting the third block. Thus, as the block counter 16 of the transmitting station is in the state C, the reception of said feed-back signal causes the outputs of the bistable circuits 68 and 69 to be deenergized, while the output of the bistable circuit 70 remains energized. Therefore the signal FIN, indicating that the reception of the feed-back signal is completed, causes the output of bistable circuit WR to be energized via gate 106. Consequently the command STOP produced upon reading the end-of-block character CL for the third block produces via gate 104 and delay circuit 105 a command IND, which start the tape reader 1 in the backward direction.

The command IND inhibits through means not shown in the drawings the transmission of intelligence over the forward channel 19 until a contrary instruction is received. A circuit not shown in the drawings is responsive to every third end-of-block character CL read when the tape is being read backward to generate a command STOP immediately followed by a command AV. Therefore in the present case said circuit is responsive to the signal CL of the first block, whereby the tape reader 1, after reading the tape backward until the end-of-block character CL of the first block, stops and restarts forward. Moreover said command AV steps the block counter to the state A. Inhibition of the transmission over the forward channel 19 is removed upon reading an end-of-block character with the tape running in the forward direction, in this case upon reading again in the forward direction the character CL of the first block. Moreover reading said character CL causes the block counter to advance one step, that is into state B.

At the receiving station, at the end of the reception of the third block, the checking circuit 24 produces a signal RCH because said block has proven valid. However it must be noted that upon receiving the heading character C of the third block, the output G0 of the bistable circuit 33 had not been energized because said heading character C did not correspond to the present state B of the block counter 26 or, in other words, because the labeling number of the third block was not the one the receiving station expected.

Therefore at the end of the reception of the third block the block counter 25 does not receive a signal MCC, whereby it remains in the state B, thus causing a feed-back signal B to be transmitted over the feed-back channel. The transmitting station, upon detecting correspondence between the feed-back signal and the state of its own block counter 16, causes the output of the bistable circuit OK to be energized, thus indicating that the transmitting staion has decided to go on to transmit the next following block, that is the third block.

Thereafter the transmission resumes its regular course.

According to a further feature of the invention, any reading-error signal EFE, which is produced on the output 12 of comparator 11 upon detecting disagreement in the double reading of a character by the tape reader 1, alters the redundancy bits computed for the block which as present is transmitted. More particularly in the embodiment shown in the drawings the signal EFE, by keeping the gate 43 closed, causes the redundancy bit generator to transmit a series of redundancy bits having the value "0."

Analogously any punching error detected by comparing a character to be punched by the punch 36 with the character effectively punched causes, through means not shown in the drawings, the eighteen redundancy bits contained in the shift register of the checking circuit 24 to be changed after receiving the block to which said redundancy bits refer.

It is thus apparent that in both cases (tape reading error and tape punching error) a block which, being unaffected by transmission disturbance, would have been interpreted as a valid one by the receiving station, is held invalid, so that the transmission system may be made aware of the reading or punching error and correct it by retransmission of the block involved.

It is obvious that in the transmission system according to the invention the blocks instead of being cyclically numbered modulo three may be numbered modulo four or more, with minor changes in the circuits. This would ensure the proper synchronism between the two stations even when transmission is made over very noisy feed-back channels.

Substantial improvements may be also obtained by coding the labeling numbers transmitted over the feed-back channel as very long bit sequences such that their probability of being subjected to mutual confusion by reason of line disturbance be a minimum.

What I claim is:

1. Data transmission system comprising:

(a) a transmitting station,
(b) a receiving station,
(c) a forward channel and a feedback channel linking said two stations, (d) means in said transmitting station for supplying an uninterrupted sequence of blocks of data,
(e) means in said transmitting station for generating a sequence of labeling numbers and for storing each labeling number for the duration of a block of data,
(f) means in said transmitting station fed by said data supplying means and by said labeling number generating means for associating a labeling number to each block of data and transmitting them over said forward channel,
(g) a block counter in said receiving station,
(h) validity checking means in said receiving station fed by said forward channel for verifying the validity of said block to generate a first signal upon detection of validity,
(i) means in said receiving station fed by said forward channel and by said block counter for comparing the labeling number associated with said block as received to the contents of said counter to generate a second signal, upon detection of agreement,
(j) means in said receiving station fed by said first and second signals and responsive to concurrent generation of said first and second signals for activating a third signal which controls said block counter to advance one step,
(k) means in said receiving station controlled by said block counter and responsive to said forward step for allowing the transmission over said feedback channel of the contents of said block counter as a feedback signal,
(l) means in said transmitting station fed by said labeling number generating means and by said feedback channel for comparing the stored labeling number of the block currently being transmitted with said feedback signal as received, for keeping said two stations in synchronism and for detecting the uncorrected reception of the receiving station signalled through said feedback signal,
(m) and means in said transmitting station responsive to said comparing means for interrupting said sequence in said supplying means and causing repetition of the transmission of a block.

2. In a signalling system for selectively transmitting one of $p$ predetermined digits each one comprising a distinct series of $n$ bits:

(a) a transmission line,
(b) means for generating a train of $n$ counting pulses,
(c) a counter feb by said generating means and having $k(>p)$ binary stages, interconnected through a logic network, whereby each one of $p$ predetermined stages is driven through a distinct series of $n$ binary bits, corresponding to the $n$ bits of one of said digits,
(d) and means for selectively connecting one of said stages to said transmission line.

3. Data transmission system comprising:

(A) a transmission channel,
(B) a feedback channel,
(C) a transmitting station connected to said two channels and comprising:
  (a) means for reading recorded blocks of data to be transmitted,
  (b) means supplied by said reading means for computing check digits from each block of data as read, said check digits having a predetermined relation with respect to the data of said read block,
  (c) means fed by said reading and said computing means for transmitting over said transmission channel said block of data with the relevant check digits,
  (d) means connected to said reading means for detecting reading errors,
  (e) means responsive to said detecting means for altering operation of said computing means to modify said check digits prior to transmission, (D) a receiving station connected to said two channels and comprising:

(a) means for receiving from said transmission channel said block of data with the relevant check digits, (b) means fed by said receiving means for verifying presence of said predetermined relation between the data of said block as received and the relevant check digits as received, and for generating a validity signal upon verifying said presence, (c) means fed by said receiving means for recording said received block of data, (d) means connected to said recording means for detecting recording errors, (e) means responsive to said detecting means for altering operation of said verifying means to inhibit generation of said validity signal, (f) alarm means connected to said altering means and operable in response to absence of said validity signal, (g) and means responsive to said alarm means for transmitting over said feedback channel a request for repetition of the block channel whose reception has caused operation of said alarm means.

4. A data transmission system comprising:

(A) a forward channel, (B) a feedback channel, (C) a transmitting station connected to said forward and feedback channels and comprising:

(a) means for uninterruptedly reading a sequence of recorded blocks of data, (b) means supplied by said reading means for computing, from each block of data as read, corresponding check digits, (c) a first block counter for generating a sequence of labeling numbers and storing each of them for the duration of a block of data, (d) means fed by said reading means and by said first block counter for associating a progressive labeling number to said block of data, (e) means fed by said associating means and by said computing means for transmitting on said forward channel said block of data with the relevant check digits and the relevant labeling number, (f) means supplied by said feedback channel for receiving a feedback signal representing a number, (g) means fed by said receiving means and said first block counter for comparing said feedback signal as received with the contents of said first block counter to produce a first or a second signal depending on whether said contents is one unit greater or less, respectively, than the number represented by said feedback signal, (h) means responsive to said second signal for rendering said reading means inoperative, (i) and means responsive to said first signal to cause said reading means to repeat reading of the two last read blocks, (D) a receiving station connected to said forward and feedback channels and comprising:

(a) means for receiving from said forward channel said transmitted block of data with the relevant check digits and the relevant labeling number, (b) means fed by said receiving means for verifying correspondence between said block of data as received and the relevant check digits as received to provide a third signal, (c) a second block counter, (d) means fed by said receiving means and said second block counter for comparing said labeling number as received with the contents of said second block counter to provide a fourth signal upon agreement, (e) means jointly responsive to said third and fourth signals for advancing said second counter one step, (f) and means controlled by said second counter and responsive to said step for transmitting as a feedback signal on said feedback channel the contents of said second counter following said step.

References Cited

UNITED STATES PATENTS

| | | | |
|---|---|---|---|
| 2,978,541 | 4/1961 | Steeneck et al. | 178—23 |
| 3,160,876 | 12/1964 | Stochel | 340—347 |
| 3,242,461 | 3/1966 | Silberg et al. | 340—146.1 |
| 3,267,460 | 8/1966 | Merrell et al. | 340—347 |

MALCOLM A. MORRISON, *Primary Examiner.*

C. E. ATKINSON, *Assistant Examiner.*